Figure 1:
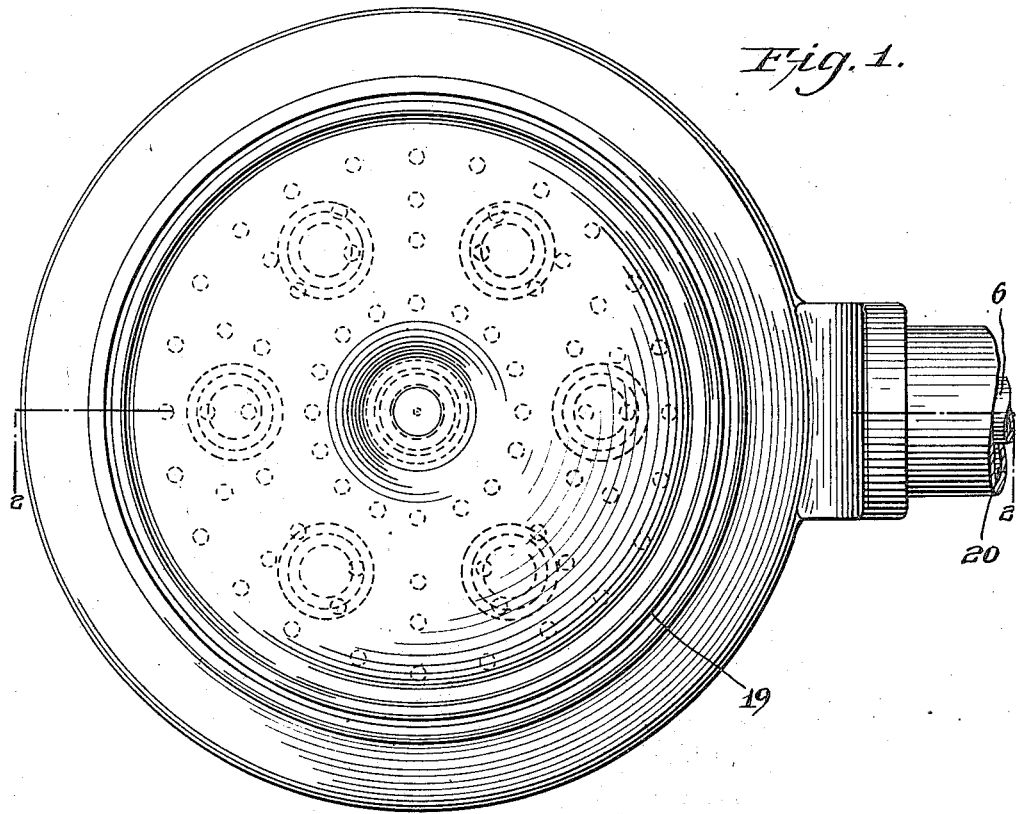

G. VAN DAAM.
GAS BURNER.
APPLICATION FILED MAY 27, 1915.

1,155,114.

Patented Sept. 28, 1915.
2 SHEETS—SHEET 1.

INVENTOR
Gerrit Van Daam
BY
*Jno. Edwardo*
ATTORNEY

G. VAN DAAM.
GAS BURNER.
APPLICATION FILED MAY 27, 1915.

1,155,114.

Patented Sept. 28, 1915.
2 SHEETS—SHEET 2.

INVENTOR
Gerrit Van Daam
BY
ATTORNEY

UNITED STATES PATENT OFFICE.

GERRIT VAN DAAM, OF BUFFALO, NEW YORK.

GAS-BURNER.

1,155,114.

Specification of Letters Patent. Patented Sept. 28, 1915.

Application filed May 27, 1915. Serial No. 30,717.

*To all whom it may concern:*

Be it known that I, GERRIT VAN DAAM, a citizen of the United States, residing at Buffalo, in the county of Erie, State of New York, have invented a new and useful Gas-Burner, of which the following is a specification.

My invention relates to improvements in gas burners.

The object is to provide improved means for heating the air and gas or kerosene separately and then combining the same at suitable points for combustion.

Referring to the drawings, which illustrate merely by way of example, suitable embodiments of my invention—

Figure 2:
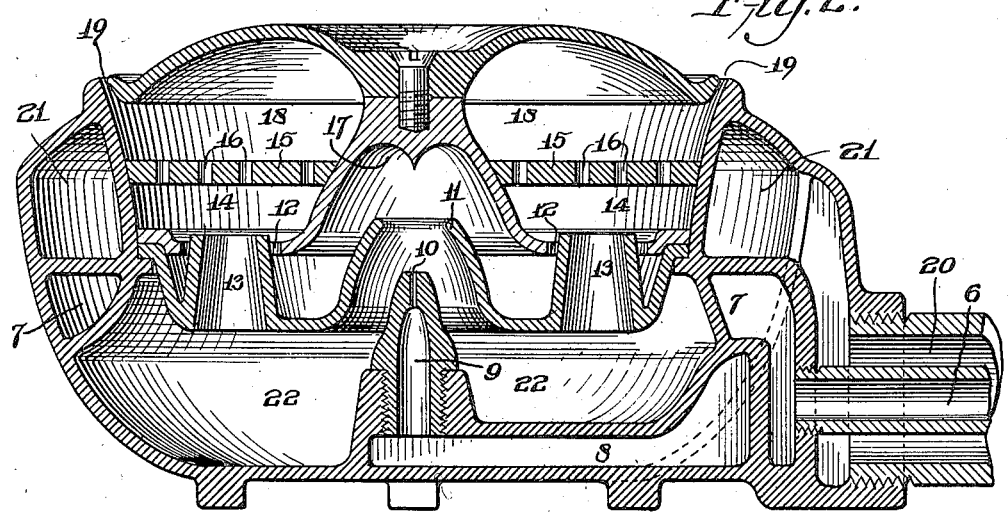
Figure 3:
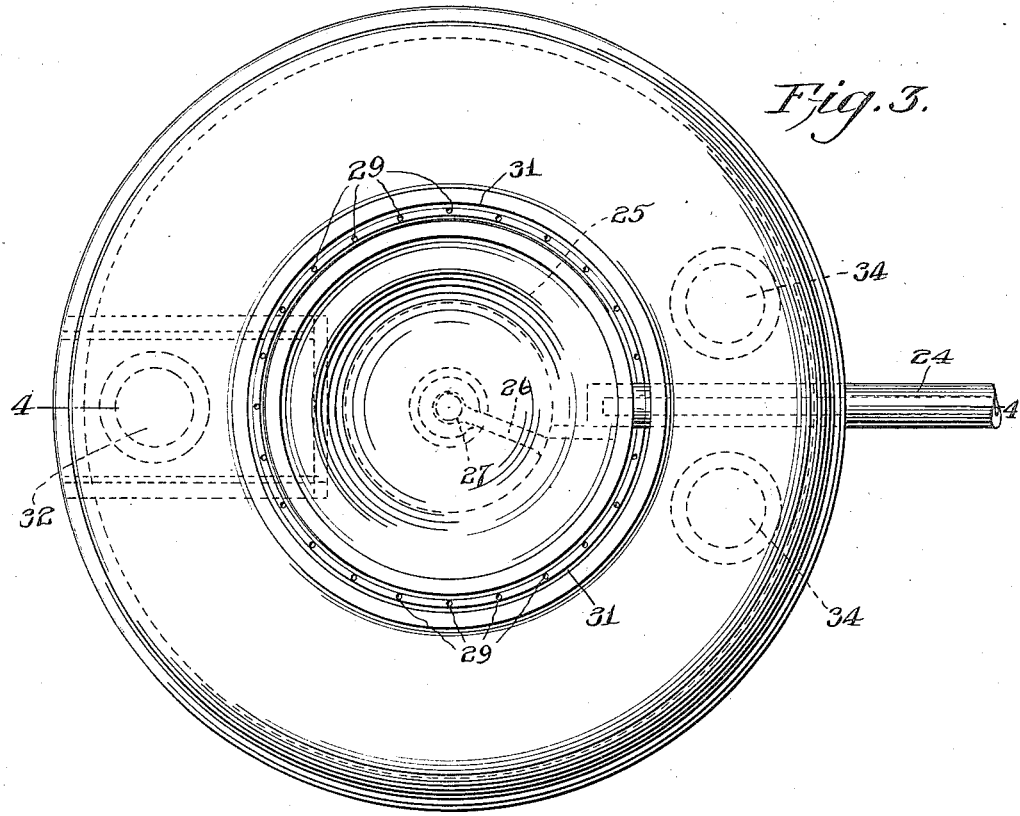
Figure 4:
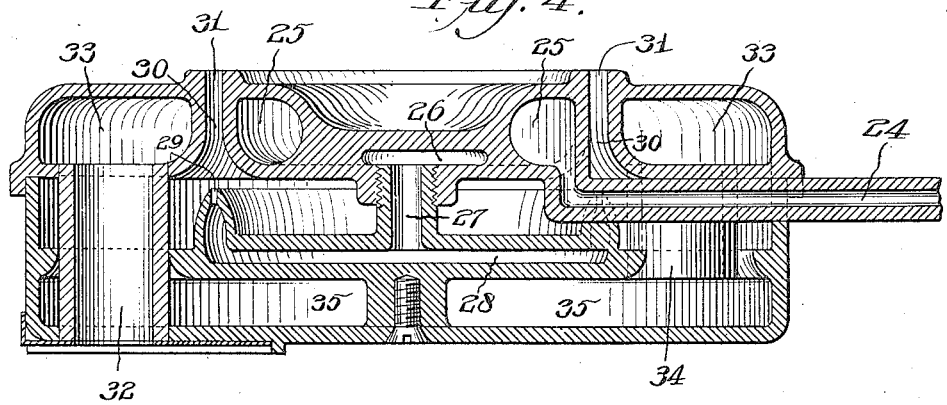

Figure 1 is a plan view. Fig. 2 is a vertical section on line 2—2 of Fig. 1. Fig. 3 is a plan view of a modified structure. Fig. 4 is a vertical section on line 4—4 of Fig. 3.

Similar numerals refer to similar parts throughout the several views.

The invention broadly speaking, comprises a chambered body into which gas or kerosene and air are delivered into separate compartments and channels respectively, and are subjected to the heat derived through the walls of the chambered body from the combustion of the mixture of gas and air.

Referring to Figs. 1 and 2, the gas or kerosene is introduced through the pipe 6 from which it passes to the annular channel 7, through which it circulates around the chambered body, thereby becoming heated, and thence through passage 8 to nozzle 9, discharging through jet 10 past injector nozzle 11 where it is mixed with air previously heated in the manner hereafter explained. This mixture of air and gas is further heated by striking the hot baffle 17, and then passes through the annular openings 12 and again mixes with air drawn through nozzles 13 into chamber 14. The mixture then is further heated by encountering the baffle plate 15 and then passes through the apertures 16 into combustion chamber 18 where it burns, the flame emerging through the annular channel 19.

The air is introduced through the pipe 20 to the annular channel 21, through which it passes around the chambered body and becomes heated by contact with the hot walls of said body. It then passes into chamber 22 and part is carried upwardly through the injector nozzle 11 and part carried upwardly through the nozzles 14 as herebefore described. As will be apparent, by the time the mixture reaches the combustion chamber 18 it will be heated to a very high temperature.

Referring to Figs. 3 and 4, the gas or kerosene is introduced into the chambered body through the pipe 24 to the annular channel 25, thence through the passages 26, 27 and 28, it is delivered to and through jets 29 and thence through channel 30 leading to burner aperture 31. The air is introduced through the bottom of channel 32 to the annular channel 33 through which it passes around the chambered body in close proximity to the burner jets thus becoming highly heated. From channel 33 the gas is carried downwardly through channels 34 to the chamber 35, whence it passes upwardly mixing with the gas delivered through the jets 29 and passes mixed with the gas through the channel 30 and the annular aperture 31 where the same is burned.

It will thus be seen that in each example, the air and gas or kerosene are introduced separately into the chambered body and are made to circulate therein, and by contacting with the hot walls of the burner are thoroughly heated before becoming mixed and delivered to the combustion jets, where the mixture is burned. It will be obvious that these chambered bodies may be round or oblong or may be in groups or series so as to suit the combustion spaces for which they are designed; for example, to suit the combustion chamber of a furnace.

By the use of the expression gas or kerosene I mean to include any hydro-carbon which may become sufficiently volatilized during its passage through the burner.

It will be noted that the chambered bodies are made of separate castings suitably fitted together, but the form and arrangement of such separate castings may be varied without departing from the spirit of the invention.

What I claim is:—

1. A burner element comprising a chambered body having a plurality of concentric chambers and annular channels, a gas or hydrocarbon supply and an air supply, one leading to one set of chambers and channels and the other leading to another set of chambers and channels separated from the first set, said channels arranged so that the gas and air must both circulate separately around the chambered body near its periphery, to cause the heating of the same, and then be brought together, mixed and superheated within said burner element, and burned.

2. A burner element for combustible mixtures comprising a chambered body having air intake and gas or hydro-carbon intake, means for circulating the air and gas separately about the chambered body so that the same shall be heated by contact with the hot walls of said body, means whereby the heated air and gas are mixed together within said chambered body and further heated, and a combustion chamber within said burner element wherein the mixture is then burned.

3. A gas burner element comprising a chambered body, an air supply and a gas or hydro-carbon supply connected therewith, the chambered body having separate annular channels connected with said supplies, discharge and mixing nozzles for bringing the air and gas together within said burner element, a hot baffle for superheating the mixture and a discharge for the burning mixture.

4. A gas burner element comprising a chambered body, an air supply and a gas supply connected therewith, the chambered body having separate annular channels connected with said supplies, said channels located near the combustion zone, discharge and mixing nozzles for bringing the air and gas together, a hot baffle for superheating the same and a discharge for the burning mixture.

5. A gas burner comprising a chambered body, an air supply and a gas supply connected therewith, the chambered body having separate annular channels connected with said supplies, discharge and mixing nozzles for bringing the air and gas together, a perforated baffle plate through which the mixture passes to be burned, and an aperture through which the flame issues.

GERRIT VAN DAAM.

Witnesses:
M. J. FRASER,
J. D. KLEIN.